United States Patent
Matteo

[19]

[11] Patent Number: 6,122,981
[45] Date of Patent: Sep. 26, 2000

[54] TRIPLE EPICYCLIC DIFFERENTIAL TRANSMISSION

[76] Inventor: Joseph C. Matteo, 721 Summit Lake Ct., Knox County, Tenn. 37922

[21] Appl. No.: 09/169,097

[22] Filed: Oct. 9, 1998

[51] Int. Cl.[7] .................................................. F16H 27/02
[52] U.S. Cl. .................... 74/89.22; 74/490.04; 74/665 F; 901/21
[58] Field of Search ............................. 74/89.22, 490.04, 74/490.06, 665 F, 665 H; 901/21, 29; 475/338, 341, 346, 347

[56] References Cited

U.S. PATENT DOCUMENTS

| | | | |
|---|---|---|---|
| 3,784,031 | 1/1974 | Niitu et al. | 901/21 X |
| 4,512,710 | 4/1985 | Flatau . | |
| 4,684,312 | 8/1987 | Antoszewski et al. . | |
| 4,704,065 | 11/1987 | Allared . | |
| 4,761,114 | 8/1988 | Barland | 901/29 X |
| 4,842,474 | 6/1989 | Torii et al. . | |
| 4,921,293 | 5/1990 | Ruoff et al. . | |
| 4,947,702 | 8/1990 | Kato | 901/21 X |
| 4,976,165 | 12/1990 | Nagahama . | |
| 5,151,008 | 9/1992 | Ishida et al. . | |
| 5,187,996 | 2/1993 | Torii et al. . | |
| 5,197,846 | 3/1993 | Uno et al. . | |
| 5,201,239 | 4/1993 | Bundo et al. . | |
| 5,207,114 | 5/1993 | Salisbury et al. . | |
| 5,231,889 | 8/1993 | Lee et al. . | |
| 5,249,479 | 10/1993 | Torii et al. . | |
| 5,697,256 | 12/1997 | Matteo . | |

OTHER PUBLICATIONS

William T. Townsend—The Effect of Transmission Design on Force–Controlled Manipulator Performance, Technical Report 1054, MIT Artificial Intelligence Laboratory.

Primary Examiner—David A. Bucci
Assistant Examiner—Colby Hansen
Attorney, Agent, or Firm—Pitts & Brittian, P.C.

[57] ABSTRACT

A triple epicyclic differential transmission for converting three parallel inputs to three orthogonal outputs. The triple epicyclic differential transmission includes three input shaft/pinion assemblies and a ring gear assembly which includes three ring gear pairs—each pair driven by an input shaft/pinion assembly in an epicyclic manner. An outer structure assembly is rotatably mounted to the ring gear assembly and an idle pulley assembly is pivotably mounted to the outer structure assembly. An output pulley assembly is rotatably mounted to the idle pulley assembly and driven by the ring gear assembly via the idle pulley assembly.

26 Claims, 8 Drawing Sheets

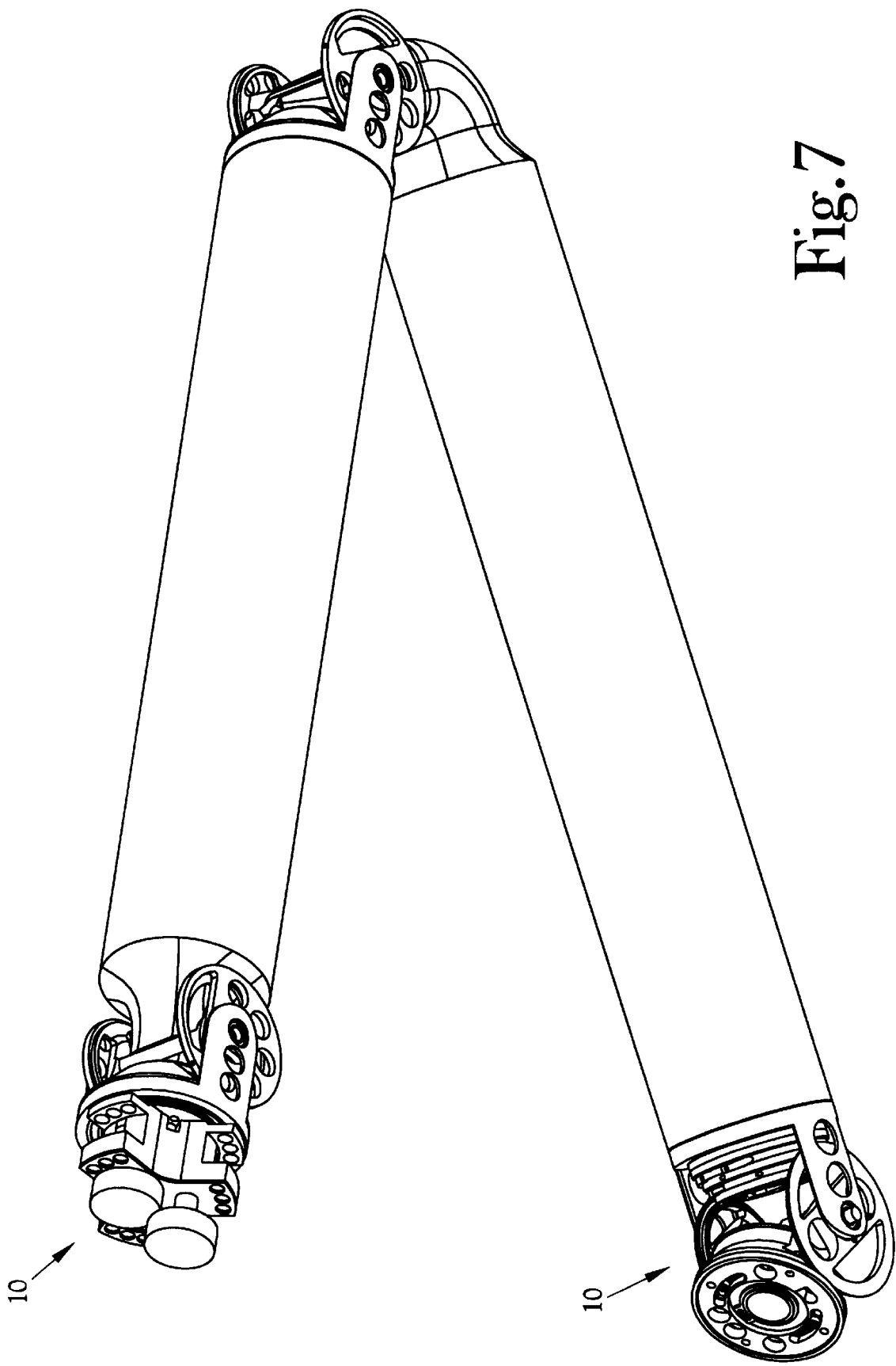

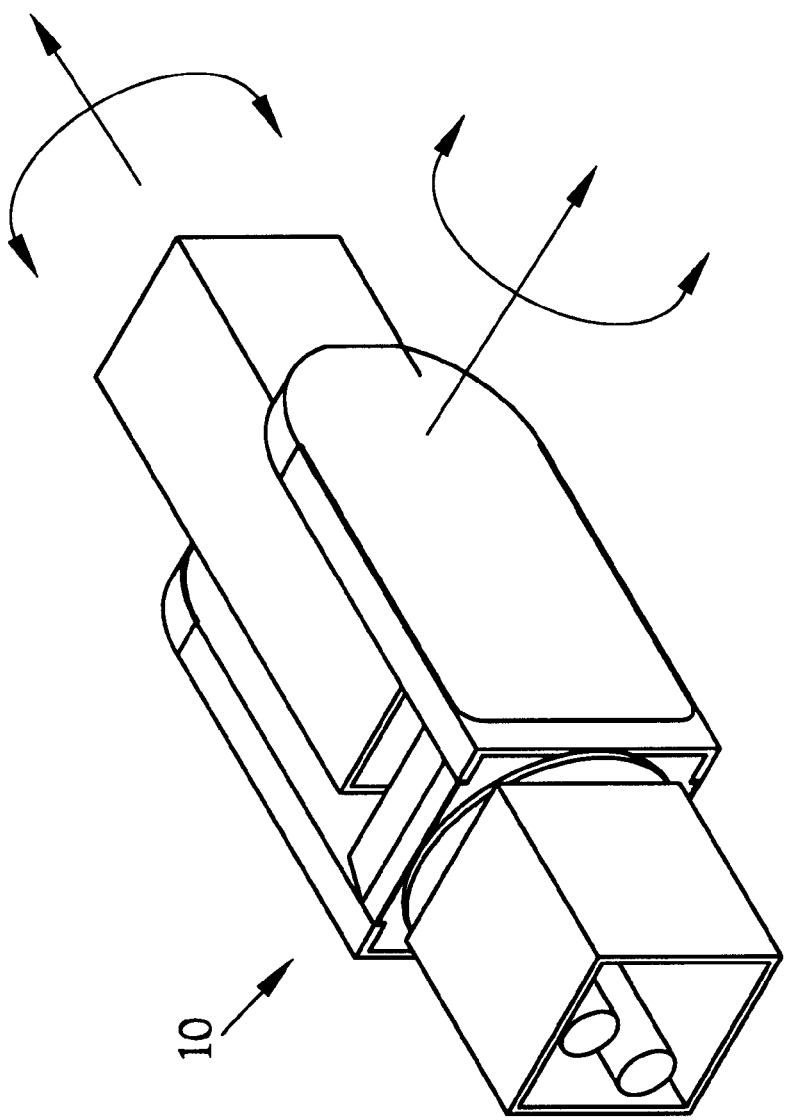

TRIPLE EPICYCLIC DIFFERENTIAL TRANSMISSION

TECHNICAL FIELD

This invention relates to the field of differential transmission mechanisms and more specifically to a differential transmission wherein three parallel inputs are converted to three orthogonal outputs through an epicyclic hybrid mechanism of cables and gears.

BACKGROUND ART

Differential transmissions are used to convert input motions to output motions changing the axes of rotation. Typical differentials utilize bevel gears in a complex assembly that generates significant bearing radial and thrust loads reacted through shafts cantilevered from bearing supports. These approaches are susceptible to backlash and are typically limited to two inputs and two outputs.

In robotic and advanced mechanism applications, differential mechanisms are often used to provide compact multijoint actuation and are either actuated directly by distributed motors or remotely via cables. Cable actuation reduces system weight but adds significant complexity to cable handling and reduces stiffness. Direct drive differentials are complex and heavy, burdened with large bearings for each rotating component to handle the reaction loads generated in the mechanism. Extremely precise gearing and components are required to keep backlash at a minimum, and direct drive and cable driven differentials are typically limited to two axes of motion.

Typical differential mechanisms are those devices disclosed in the following U.S. Patents:

| U.S. Pat. No. | Inventor(s) | Issue Date |
| --- | --- | --- |
| 4,512,710 | Flatau | April 23, 1985 |
| 4,684,312 | Antoszewski et al. | August 4, 1987 |
| 4,704,065 | Allared | November 3, 1987 |
| 4,842,474 | Torii et al. | June 27, 1989 |
| 4,921,293 | Ruoff et al. | May 1, 1990 |
| 4,976,165 | Nagahama | Dec. 11, 1990 |
| 5,151,008 | Ishida et al. | Sept. 29, 1992 |
| 5,187,996 | Torii et al. | February 23, 1993 |
| 5,197,846 | Uno et al. | March 30, 1993 |
| 5,201,239 | Bundo et al. | April 13, 1993 |
| 5,207,114 | Salisbury, Jr. et al. | May 4, 1993 |
| 5,231,889 | Lee et al. | August 3, 1993 |
| 5,249,479 | Torii et al. | October 5, 1993 |
| 5,697,256 | Matteo | Dec. 16, 1997 |

The devices disclosed in the above-identified patents are actuated via distributed direct motor actuation or remote cable actuation and most are limited to two axes of motion. The advantages and disadvantages of which are addressed above. More specifically U.S. Pat. No. 5,207,114 is an example of a whole arm manipulator which utilizes remote actuation through a four axis cable driven differential. The manipulator utilizes a complex array of cables and pulleys providing all speed reduction and differential action. The system is extremely difficult to assemble and maintain and is impractical for reliable robotic service. U.S. Pat. No. 5,697,256 is an example of a Hybrid Differential Transmission which utilizes a combination of planetary input gearing and cable output to achieve a compact two-axis differential. This design does not eliminate backlash and utilizes bearings to support all rotating components.

Therefore, it is an object of this present invention to provide a triple epicyclic differential transmission which converts three parallel input motions to three orthogonal output motions.

It is yet another object of the present invention to provide a triple epicyclic differential transmission which utilizes a combination of planetary gear drives and cable drives.

Moreover, it is another object of the present invention to provide a triple epicyclic differential transmission which is designed to provide zero backlash and zero thrust loads.

Further, it is an object of the present invention to provide a triple epicyclic differential transmission which provides a large ratio of cable to pulley diameter, and temperature and wear compensation.

It is yet another object of the present invention to provide a triple epicyclic differential transmission which includes a large opening through the center for accommodating signal wires.

It is also an object of this present invention to provide a triple epicyclic differential transmission wherein a plurality of the transmissions can be combined for a variety of purposes.

Further, it is an object of this present invention to provide a triple epicyclic differential transmission wherein output joints can be locked thereby reducing the number of axes while maintaining all the advantages of the invention.

DISCLOSURE OF THE INVENTION

Other objects and advantages will be accomplished by the present invention which serves to convert input motions to output motions changing the axes of rotation. The triple epicyclic differential transmission is generally comprised of three input shaft/pinion assemblies, a ring gear assembly including at least three ring gears each one of which is driven by one of the three input shaft/pinion assemblies, an output pulley assembly including a first, second and third output pulley driven by the ring gear assembly via an idle pulley assembly which includes an output shaft on which the output pulley assembly is rotatably mounted and an outer structure assembly to which the idle pulley assembly is pivotably mounted.

BRIEF DESCRIPTION OF THE DRAWINGS

The above mentioned features of the invention will become more clearly understood from the following detailed description of the invention read together with the drawings in which:

FIG. 7 illustrates the triple epicyclic differential transmission applied to a seven degree-of-freedom (DOF) manipulator; and, FIG. 8 illustrates the triple epicyclic differential transmission of the present invention applied to a two degree-of-freedom wrist for a robotic vehicle.

BEST MODE FOR CARRYING OUT THE INVENTION

A triple epicyclic differential transmission incorporating various features of the present invention is illustrated generally at 10 in the figures. The triple epicyclic differential transmission 10 is designed to convert three parallel input motions to three orthogonal output motions through a hybrid mechanism of both rigid and flexible transmission components rotating in an epicyclic manner and preloaded to eliminate backlash.

Figure 1:
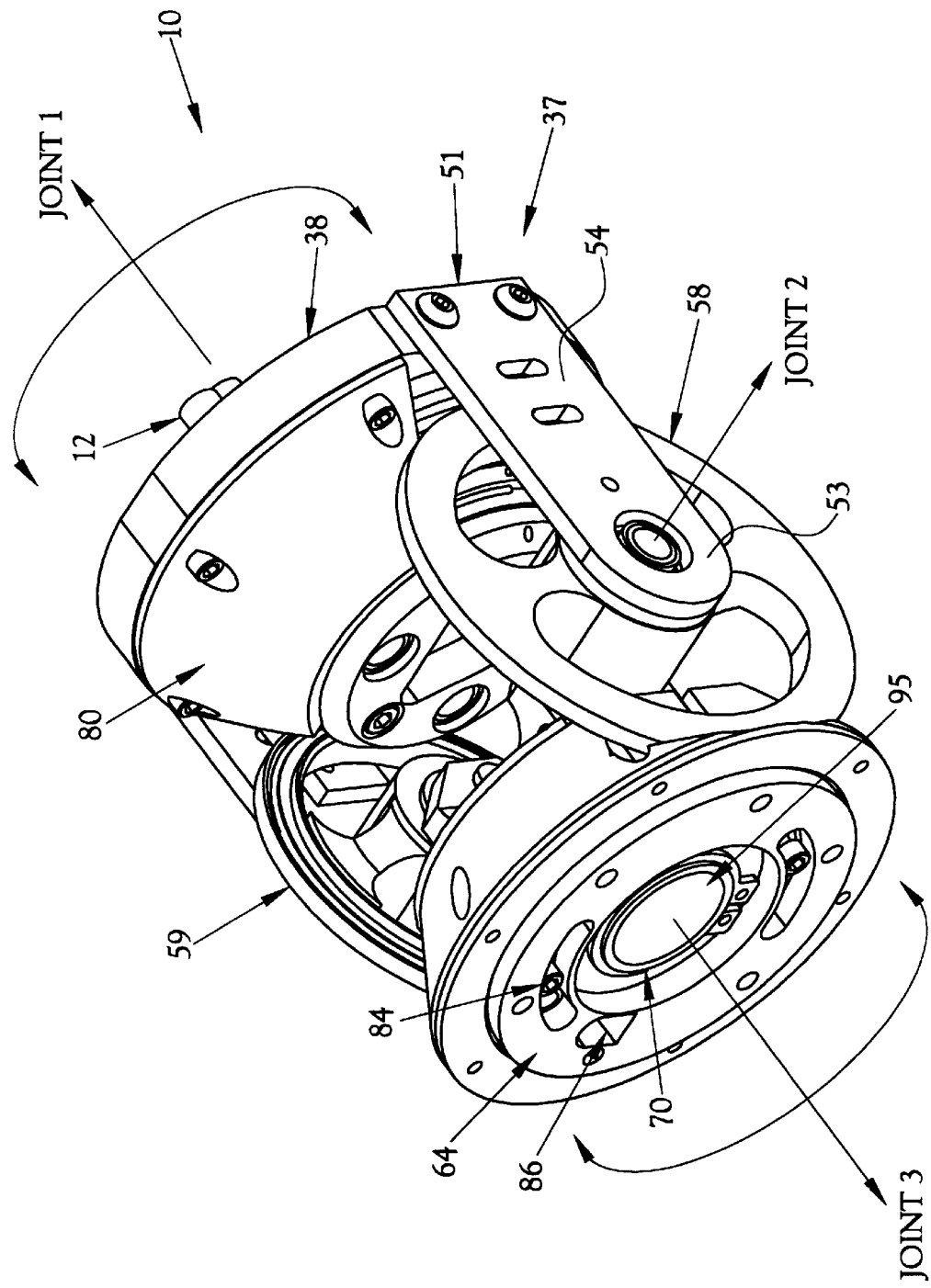
FIG. 1 is a front perspective view of the triple epicyclic differential transmission constructed in accordance with several features of the present invention.
Figure 2:
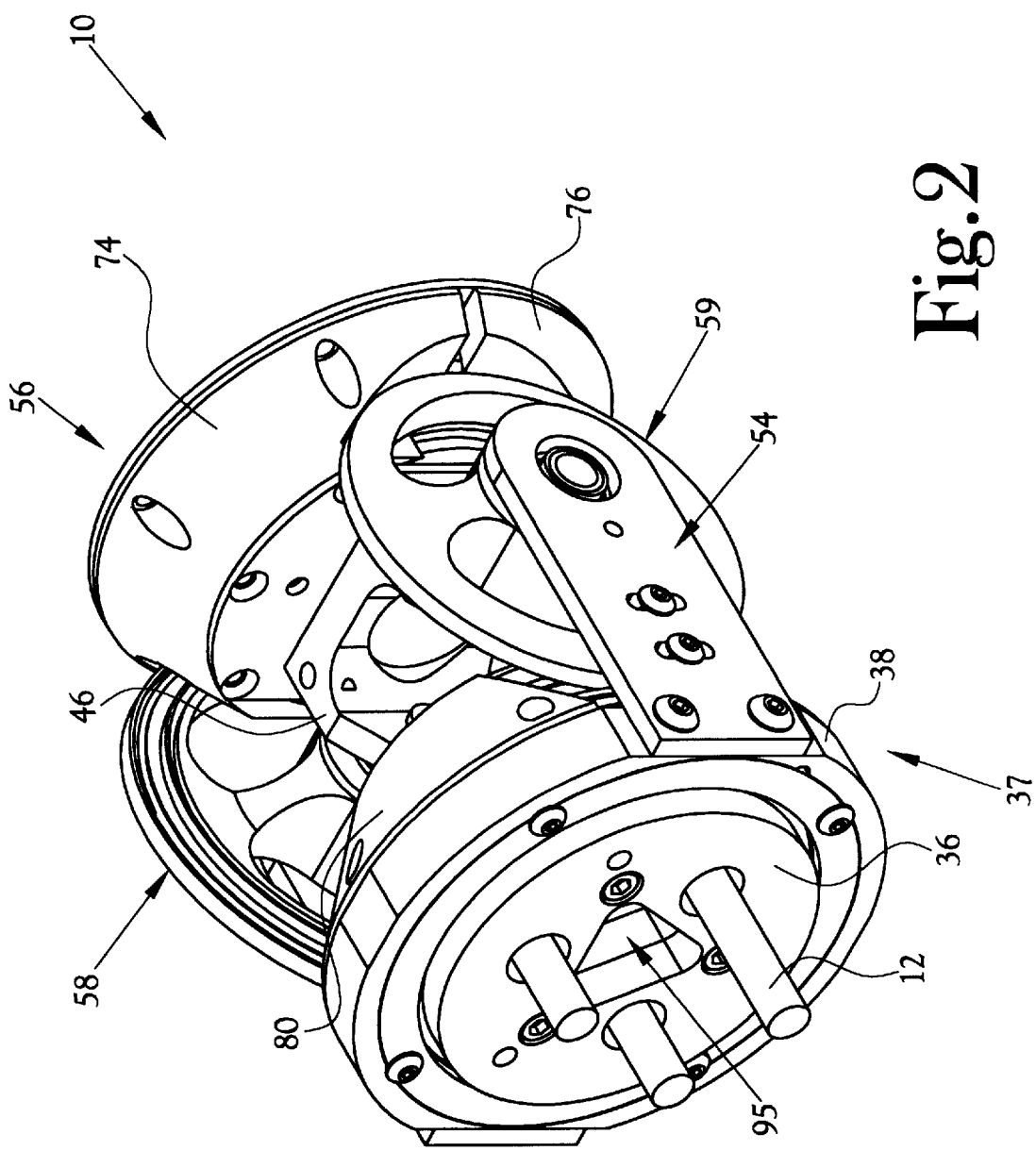
FIG. 2 illustrates a rear perspective view of the triple epicyclic differential transmission.
Figure 6:
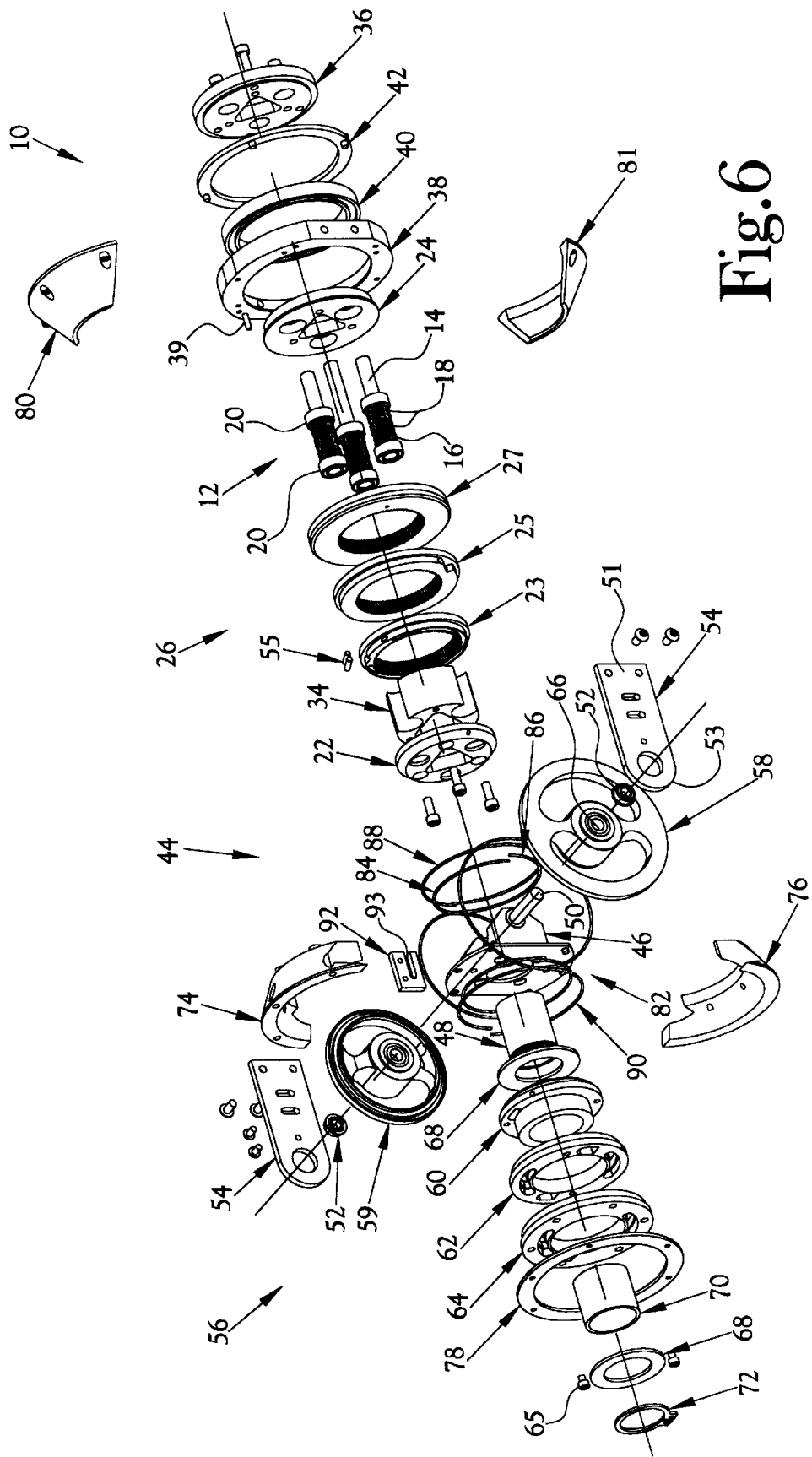
FIG. 6 is an exploded view of the triple epicyclic differential transmission of the present invention.

FIG. 1 illustrates a front perspective view of the triple epicyclic differential transmission 10 of the present invention, FIG. 2 is a rear perspective view of the transmission 10, and FIG. 6 illustrates the exploded view of the transmission 10. The transmission 10 is comprised generally of three input shaft/pinion assemblies 12 which drive a ring gear assembly 26. An output pulley assembly 56 is driven by the ring gear assembly 26 via an idle pulley assembly 44. The differential transmission 10 further includes an outer structure assembly which is mounted to the ring gear assembly 26 and to the idle pulley assembly. The rotation and direction of rotation of the three input shaft/pinion assemblies 12 controls the three output motions.

Each input shaft/pinion assembly 12 is comprised of a shaft 14 to which one drive pinion 16 is secured and to which two idle pinions 18 are rotatably mounted. Further, in the preferred embodiment, a pair of bearings 20 is rotatably mounted to the shaft 14 on opposing sides of the pinions 16, 18.

Figure 4:
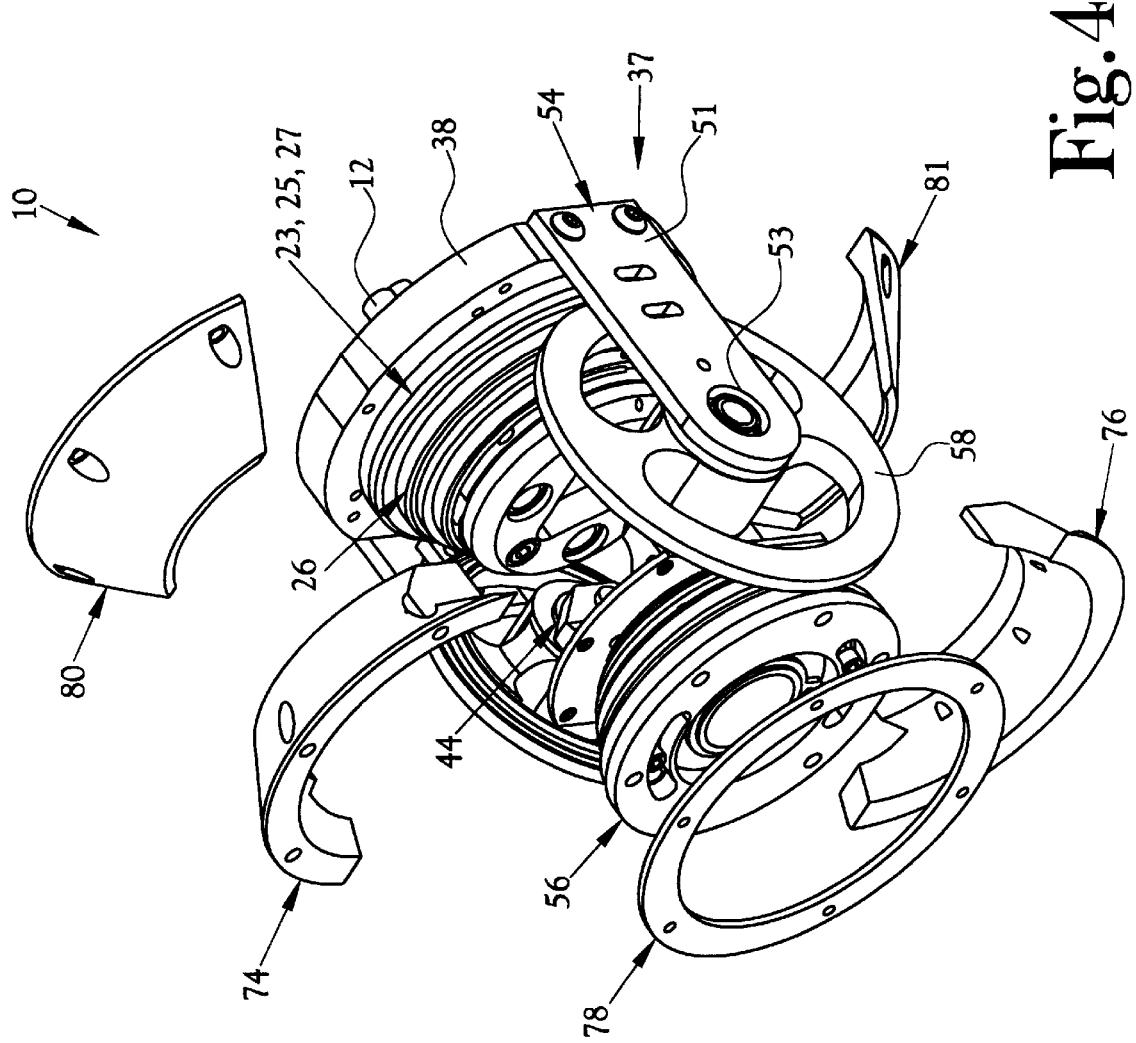
FIG. 4 is a front perspective view of the triple epicyclic differential transmission with the cable covers removed.

As illustrated most clearly in FIG. 6, the ring gear assembly 26 includes a first ring gear pair 23, a second ring gear pair 25 and a third ring gear pair 27. The first ring gear pair 23 is comprised of two ring gears 28 and 29, the second ring gear pair 25 is comprised of two ring gears 30 and 31 and the third ring gear pair is comprised of two ring gears 32 and 33. Each pair is driven by one of the three input shaft/pinion assemblies 12. Specifically, the drive pinion 16 of each input shaft/pinion assembly 12 is positioned on its respective shaft 14 such that the teeth of the pinion 16 mesh with the teeth of the gear pair it drives. The idle pinions 18, along with the drive pinion 16, of each input shaft/pinion assembly 12 serve to support the three ring gear pairs 23, 25, 27, in a bearingless manner, such that they rotate in a circular manner. More specifically, the drive pinion 16 of one input shaft/pinion assembly 12 and the idle pinions 18 of two of the remaining input shaft/pinion assemblies 12 support each ring gear pair. In the preferred embodiment, the ring gear assembly 26 further includes a front ring gear retainer 22 and a rear ring gear retainer 24 for supporting the shaft 14 via the bearings 20, as shown in FIG. 6. In the preferred embodiment, the ring gear assembly 26 is rotatably mounted to a motor mount 36. The ring gear assembly 26 also includes an internal spacer 34 for spacing the input shaft/pinion assemblies 12. Further, in the preferred embodiment, the ring gear assembly 26 is rotatably encased between an upper and lower ring gear cover 80, 81, as shown in the Figures. FIG. 4 is a front perspective view of the invention 10 with the ring gear covers 80, 81 removed.

The idle pulley assembly 44 is comprised of a mounting block 46, an output shaft 48, two idle pulley shafts 50, two idle pulleys 58, 59, and a cable system 82, as shown in FIG. 6. Each of the idle pulleys 58, is rotatably mounted to one of the idle pulley shafts 50 with bearings 66, as shown in the exploded views of FIGS. 5 and 6.

The output pulley assembly 56 includes three output pulleys 60, 62, and 64. The output pulleys 60, 62 and 64 are rotatably mounted to the output shaft 48 via thrust bearings 68 and radial bearings 70 and retained by a snap ring 72, as shown in FIG. 6. In the preferred embodiment, the output pulley assembly 56 further includes an upper output pulley cover 74, a lower output pulley cover 76 and an end plate 78 which is secured to the upper and lower covers 74, 76. The covers 74, 76 and the end plate 78 are mounted around the output pulleys 60, 62, 64 such that the output pulleys can rotate therein. FIG. 4 illustrates the transmission 10 with output pulley covers 74, 76 and end plate 78 removed.

The outer structure assembly 37 includes two side plates 54 and an outer structure base plate 38. The outer structure base plate 38 is mounted to the ring gear assembly 26 via a bearing 40 positioned between rear ring gear retainer 24 and the motor mount 36. The bearing 40 is retained in the outer structure base plate 38 by a clamp ring 42. A first end 51 of the side plates 54 are mounted to opposing sides of the outer structure base plate 38 and a second end 53 of each side plate 54 is pivotably mounted to each of the idle pulley shafts 50 via a bearing 52, as shown in FIGS. 1, 2 and 6.

Figure 5:
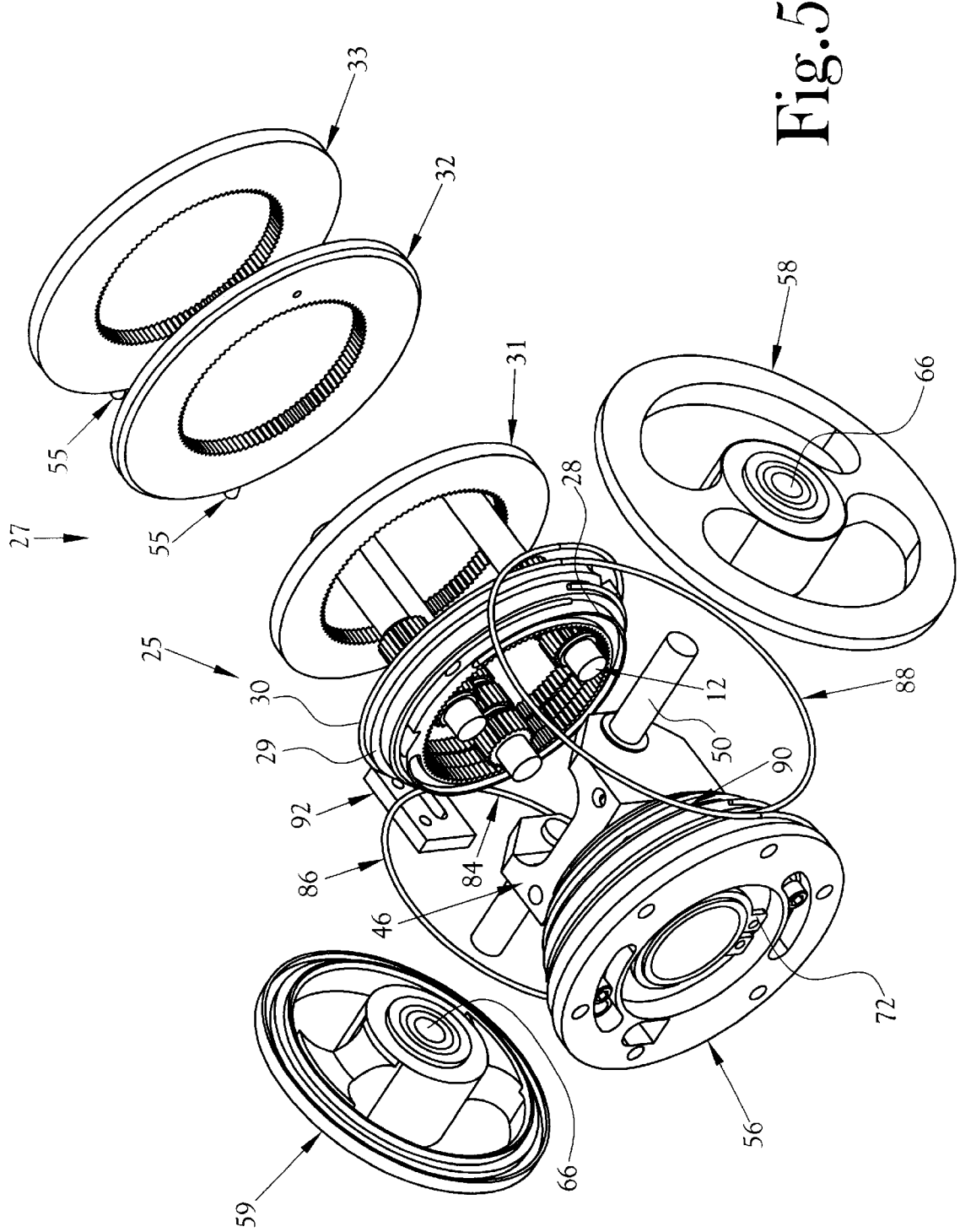
FIG. 5 is an exploded view of the drive components and cables of the triple epicyclic differential transmission of the present invention.

The output pulley assembly 56 is driven by the ring gear assembly 26 via the cable system 82 of the idle pulley assembly 44. Specifically, the cable system 82 includes a plurality of cables 84, 86, 88, and 90. FIG. 5 is an exploded view of the interior components and the cable routings. A first end of the first cable 84 is mounted to the first ring gear 28 of the first ring gear pair. The first cable 84 extends from the first ring gear 28 of the first ring gear pair 23 to the idle pulley 59 and then to the first output pulley 60 to which the second end of the first cable 84 is secured. The second cable 86 extends in a reverse direction to the first cable 84. The first end of the second cable 86 is mounted to the second ring gear 29. The second cable 86 extends from the second ring gear 29 of the first ring gear pair 23 to the idle pulley 59 and then to second output pulley 62 to which the second end of the second cable 86 is secured. The second output pulley 62 is rotated to apply a force to ring gears 28 and 29 in opposite directions against the drive pinion 16 which drives the first ring gear pair 23 thereby eliminating backlash with preload to the cables 84 and 86. The second output pulley 62 is then fastened to the first output pulley 60.

A first end of the third cable 88 is mounted to the first ring gear 30 of the second ring gear pair 25. The third cable 88 extends from the first ring gear 30 of the second ring gear pair 25 to the idle pulley 58 and then to the second output pulley 62 to which the second end of the third cable is secured. A fourth cable 90 extends in a reverse direction to the third cable 88. A first end of the fourth cable 90 is mounted to second ring gear 31 of the second ring gear pair 25. The fourth cable 90 extends around the second ring gear 31 to the idle pulley 58 and then to the third output pulley 64 to which the second end of the fourth cable 90 is secured. The third output pulley 64 is rotated to apply a force to ring gears 30 and 31 in opposite directions against the drive pinion 16 which drives the second ring gear pair 25 thereby eliminating backlash with preload to the cables. The third output pulley 64 is secured to the second output pulley 62 with locking screws 65.

The third ring gear pair 27 is locked in place via pins 55. Specifically, each of the first ring gear 32 and the second ring gear 33 of the third ring gear pair 27 carries a pin 55 on its outer radial surface. The pin 55 of the second ring gear 33 is locked against a stop 39 mounted to the outer structure base plate 38. Then, the first ring gear 32 is rotated to apply a force, in opposite directions, to the drive pinion 16 which drives the third ring gear pair 27 and is locked in place via the pin 55 carried thereon against a spring plate 92, shown in FIGS. 5 and 6, attached to the side plate 54.

Preload is applied through spring washers (not shown) at the cable ends internal to the second and third output pulleys 62 and 64 and with the spring plate 92. Specifically, the spring plate 92 defines a slot 93 such that it can compress and subsequently expand. Applied preload is sufficient to eliminate backlash under load and to compensate for structural changes due to temperature and wear.

The three ring gear pairs 23, 25 and 27 are solely supported each by three pinions; one drive pinion 16 and two idle pinions 18. No axial thrust loads are applied to the ring gears and all radial loads are reacted through the gear teeth to the input shaft/pinion assemblies.

Joints 1, 2 and 3 of rotation are illustrated in FIG. 1. Joint 1 and Joint 2 loads are reflected back to the two input shafts 14 through a dual load path thus sharing all loads equally between them. Joint 3 loads are reflected back to the three input shafts 14 through a triple load path thus sharing all loads equally between them. FIG. 5 illustrates how cable pairs 84 & 86 and 88 & 90 apply tension in directly opposing directions to each of the ring gears, idle pulleys, and output pulleys they contact, thus eliminating thrust loads and radial loads induced by cable tensioning. The same applies to the third ring gear pair 27 preloaded through pins 55 in opposing directions. An applied load at the third output pulley 64 will generate radial loads through the first and second ring gear pairs 23 and 25 to the drive pinion 16 and shaft 14 and idle pinions 18. It will be noted that the ring gear pulleys, idle pulleys, and output pulleys are significantly larger in diameter than the drive cables thus reducing wear and fatigue.

Figure 3:
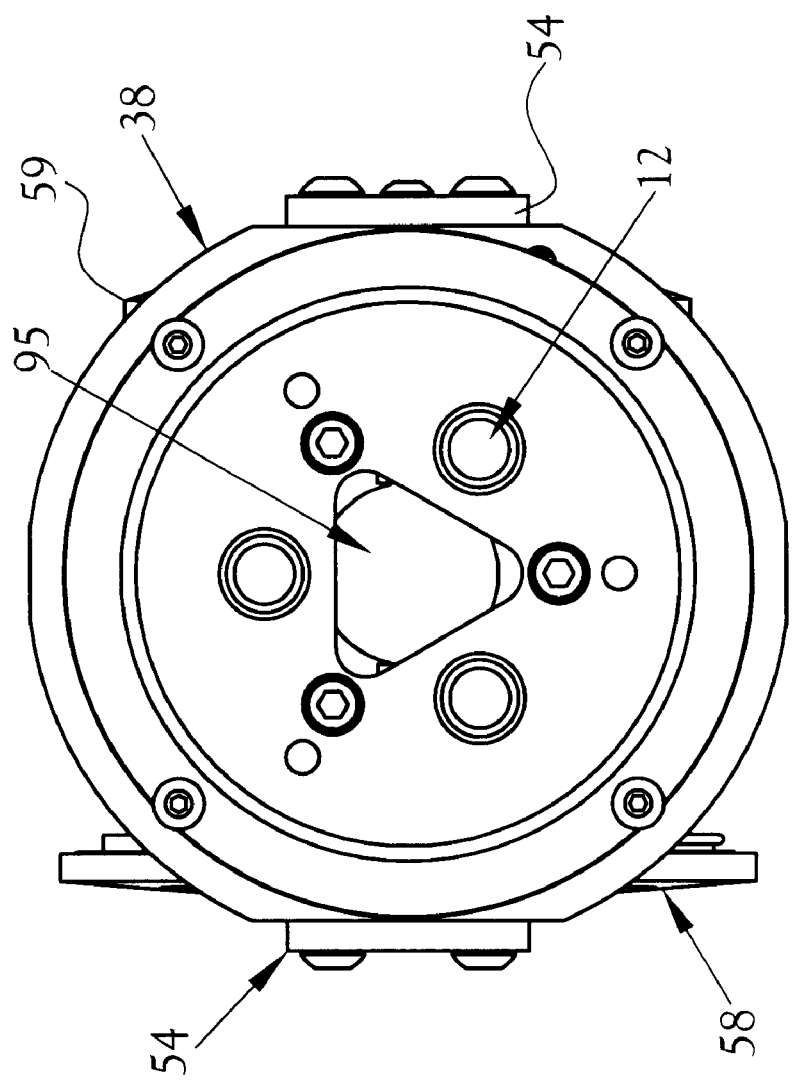
FIG. 3 is a rear view of the triple epicyclic differential transmission.

It will be noted that, as shown in FIG. 3, the ring gear assembly 26, idle pulley assembly 44 and output pulley assembly 56 cooperate to define a large central opening 95 for the passage of control wires.

FIG. 7 illustrates a seven degree-of-freedom (DOF) manipulator for teleoperation applications utilizing the triple epicyclic differential in the wrist and two triple hybrid differentials in the elbow and shoulder reduced to double hybrid differentials with joint 3 constrained or eliminated. FIG. 8 illustrates a two DOF wrist for a robotic vehicle application with the output rotation eliminated. All triple hybrid differential features including bearingless ring gears and zero backlash are preserved when a joint is locked to address specific application needs.

From the foregoing description, it will be recognized by those skilled in the art that a triple epicyclic differential transmission offering advantages over the prior art has been provided. Specifically, the triple epicyclic differential transmission of the present converts three parallel input motions to three orthogonal output motions and utilizes a combination of planetary gear drives and cable drives. Further, the triple epicyclic differential transmission is designed to provide zero backlash and zero thrust loads. Moreover, the triple epicyclic differential transmission provides a large ratio of cable to pulley diameter, and temperature and wear compensation. The triple epicyclic differential transmission also includes a large opening through the center for accommodating signal wires. A plurality of the triple epicyclic differential transmission can be combined for a variety of purposes. Further, the output joints of the transmission can be locked or eliminated thereby reducing the number of axes while maintaining all the advantages of the invention.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A triple epicyclic differential transmission for converting three parallel inputs to three orthogonal outputs changing the axes of rotation, said triple epicyclic differential transmission comprising:

three input shaft/pinion assemblies;

a ring gear assembly including at least three ring gears each driven by one of said three input shaft/pinion assemblies;

an output pulley assembly including a first, second and third output pulley driven by said ring gear assembly via an idle pulley assembly which includes an output shaft on which said output pulley assembly is rotatably mounted; and, an outer structure assembly to which said idle pulley assembly is pivotably mounted.

2. The triple epicyclic differential transmission of claim 1 wherein said ring gear assembly includes a first, second and third ring gear pair, each of said ring gears pairs being driven by one of said three input shaft/pinion assemblies, each of said ring gears of said first, second and third ring gear pairs being preloaded in opposing directions against said input shaft/pinion assembly which drives said ring gear pair.

3. The triple epicyclic differential transmission of claim 2 wherein each of said first, second and third three ring gear pairs are preloaded.

4. The triple epicyclic differential transmission of claim 1 wherein each of said three input shaft/pinion assemblies includes a shaft to which one drive pinion is secured and to which two idle pinions are rotatably mounted, each of said three ring gears being driven by one of said drive pinions of one of said three input/shaft pinion assemblies and supported by two of said idle pinions of the remaining of said three input shaft/pinion assemblies such that each of said three ring gears rotates in a circular manner.

5. The triple epicyclic differential transmission of claim 1 wherein said idle pulley assembly includes a mounting block, an output shaft, two idle pulley shafts, a first and second idle pulley, and a cable system, said output shaft extending from a rear portion of said mounting block, each said two idle pulley shafts extending from opposing sides of said mounting block, each of said first and second idle pulleys being rotatably mounted to one of said idle pulley shafts, said cable system for driving said three output pulleys via said ring gear assembly.

6. The triple epicyclic differential transmission of claim 5 wherein said ring gear assembly includes a first, second and third ring gear pairs, each of said ring gears pairs being driven by one of said three input shaft/pinion assemblies, said cable system including a first cable, a second cable, a third cable and a fourth cable, a first end of said first cable being mounted to a first ring gear of said first ring gear pair, said first cable extending from said first ring gear of said first ring gear pair to said first idle pulleys and then to said first output pulley to which a second end of said first cable is secured, a first end of said second cable being mounted to a second ring gear of said first ring gear pair, said second cable extending from said second ring gear of said first ring gear pair to said first idle pulley and then to said second output pulley to which a second end of said second cable is secured, said second cable extending in a direction opposite to said first cable, a first end of said third cable being mounted to a first ring gear of said second ring gear pair, said third cable extending from said first ring gear of said second ring gear pair to said second idle pulley and then to said second output pulley to which a second end of said third cable is secured, a first end of said fourth cable being mounted to a second ring gear of said second ring gear pair, said fourth cable extending around said second ring gear of said second ring gear pair to said second idle pulley and then to said third output pulley to which a second end of said fourth cable is secured, said fourth cable extending in a direction opposite to said third cable.

7. The triple epicyclic differential transmission of claim 6 wherein said second output pulley is rotated to apply a force to said first and second ring gears of said first ring gear pair in opposite directions against said drive pinion which drives said first ring gear pair thereby preloading said first ring gear pair, said second output pulley being fastened to said first output pulley such that a preloaded condition is maintained.

8. The triple epicyclic differential transmission of claim 6 wherein said third output pulley is rotated to apply a force to said first and second ring gears of said second ring gear pair in opposite directions against said drive pinion which drives said second ring gear pair thereby preloading said second ring gear pair, said third output pulley being secured to said second output pulley such that a preloaded condition is maintained.

9. The triple epicyclic differential transmission of claim 6 wherein a ratio of a diameter of said ring gears, said first and second idle pulleys and said three output pulley to a diameter of said cables is large such that cable fatigue and wear is minimized.

10. The triple epicyclic differential transmission of claim 2 wherein each of the first ring gear and the second ring gear of said third ring gear pair carries a pin on an outer radial surface thereof said pin carried on said second ring gear of said third ring gear pair being locked against a stop mounted to said base plate, said first ring gear of said third ring gear pair being rotated to apply a force, in opposite directions, to said drive pinion which drives said third ring gear pair such that said third ring gear pair is preloaded against said drive pinion, said first ring gear of said third ring gear pair being locked in place via said pin carried thereon against a spring plate attached to said side plate such that a preloaded condition is maintained.

11. The triple epicyclic differential transmission of claim 1 wherein said outer structure assembly is rotatable with respect to said ring gear assembly to define a first output joint, said output shaft being pivotable with respect to said outer structure assembly to define a second output joint, said output pulley assembly being rotatable with respect to said output shaft to define a third output joint.

12. The triple epicyclic differential transmission of claim 11 wherein a first and second of said three input shaft/pinion assemblies provide a dual load path to said first and second output joints.

13. The triple epicyclic differential transmission of claim 11 wherein said three input shaft/pinion assemblies provide a triple load path to said third output joint.

14. The triple epicyclic differential transmission of claim 1 wherein said ring gear assembly, said idle pulley assembly and said output pulley assembly cooperate to define at least one passage therethrough.

15. The triple epicyclic differential transmission of claim 1 wherein said outer structure assembly includes a base plate and two side plates, said base plate rotatably mounted to said ring gear assembly, a first end of each of said side plates being mounted to opposing sides of said base plate, a second end of each of said two side plates being pivotably mounted to said idle pulley assembly.

16. A triple epicyclic differential transmission for converting three parallel inputs to three orthogonal outputs changing the axes of rotation, said triple epicyclic differential transmission comprising:

three input shaft/pinion assemblies;

a ring gear assembly including a first, second and third ring gear pair each driven by one of said three input shaft/pinion assemblies, each of said ring gears of said first, second and third ring gear pairs being preloaded in opposing directions against said input shaft/pinion assembly which drives said ring gear pair;

an output pulley assembly including a first, second and third output pulley driven by said ring gear assembly via an idle pulley assembly which includes an output shaft on which said output pulley assembly is rotatably mounted; and, an outer structure assembly to which said idle pulley assembly is pivotably mounted, said outer structure assembly being rotatable with respect to said ring gear assembly to define a first output joint, said output shaft being pivotable with respect to said outer structure assembly to define a second output joint, said output pulley assembly being rotatable with respect to said output shaft to define a third output joint.

17. The triple epicyclic differential transmission of claim 16 wherein each of said three input shaft/pinion assemblies includes a shaft to which one drive pinion is secured and to which two idle pinions are rotatably mounted, each of said three ring gears being driven by one of said drive pinions of one of said three input/shaft pinion assemblies and supported by two of said idle pinions of the remaining of said three input shaft/pinion assemblies such that each of said three ring gears rotates in a circular manner.

18. The triple epicyclic differential transmission of claim 16 wherein said idle pulley assembly includes a mounting block, an output shaft, two idle pulley shafts, a first and second idle pulley, and a cable system, said output shaft extending from a rear portion of said mounting block, each said two idle pulley shafts extending from opposing sides of said mounting block, each of said first and second idle pulleys being rotatably mounted to one of said idle pulley shafts, said cable system for driving said three output pulleys via said ring gear assembly.

19. The triple epicyclic differential transmission of claim 18 wherein said ring gear assembly includes a first, second and third ring gear pairs, each of said ring gears pairs being driven by one of said three input shaft/pinion assemblies, said cable system including a first cable, a second cable, a third cable and a fourth cable, a first end of said first cable being mounted to a first ring gear of said first ring gear pair, said first cable extending from said first ring gear of said first ring gear pair to said first idle pulleys and then to said first output pulley to which a second end of said first cable is secured, a first end of said second cable being mounted to a second ring gear of said first ring gear pair, said second cable extending from said second ring gear of said first ring gear pair to said first idle pulley and then to said second output pulley to which a second end of said second cable is secured, said second cable extending in a direction opposite to said first cable, a first end of said third cable being mounted to a first ring gear of said second ring gear pair, said third cable extending from said first ring gear of said second ring gear pair to said second idle pulley and then to said second output pulley to which a second end of said third cable is secured, a first end of said fourth cable being mounted to a second ring gear of said second ring gear pair, said fourth cable extending around said second ring gear of said second ring gear pair to said second idle pulley and then to said third output pulley to which a second end of said fourth cable is secured, said fourth cable extending in a direction opposite to said third cable.

20. The triple epicyclic differential transmission of claim 19 wherein said second output pulley is rotated to apply a force to said first and second ring gears of said first ring gear pair in opposite directions against said drive pinion which drives said first ring gear pair thereby preloading said first ring gear pair, said second output pulley being fastened to said first output pulley such that a preloaded condition is maintained.

21. The triple epicyclic differential transmission of claim 19 wherein said third output pulley is rotated to apply a force to said first and second ring gears of said second ring gear pair in opposite directions against said drive pinion which drives said second ring gear pair thereby preloading said second ring gear pair, said third output pulley being secured to said second output pulley such that a preloaded condition is maintained.

22. The triple epicyclic differential transmission of claim 19 wherein a ratio of a diameter of said ring gears, said first and second idle pulleys and said three output pulley to a diameter of said cables is large such that cable fatigue and wear is reduced.

23. The triple epicyclic differential transmission of claim 16 wherein each of the first ring gear and the second ring gear of said third ring gear pair carries a pin on an outer radial surface thereof, said pin carried on said second ring gear of said third ring gear pair being locked against a stop mounted to said base plate, said first ring gear of said third ring gear pair being rotated to apply a force, in opposite directions, to said drive pinion which drives said third ring gear pair such that said third ring gear pair is preloaded against said drive pinion, said first ring gear of said third ring gear pair being locked in place via said pin carried thereon against a spring plate attached to said side plate such that a preloaded condition is maintained.

24. The triple epicyclic differential transmission of claim 16 wherein a first and second of said three input shaft/pinion assemblies provide a dual load path to said first and second output joints.

25. The triple epicyclic differential transmission of claim 16 wherein said three input shaft/pinion assemblies provide a triple load path to said third output joint.

26. The triple epicyclic differential transmission of claim 16 wherein said ring gear assembly, said idle pulley assembly and said output pulley assembly cooperate to define at least one passage therethrough.

\* \* \* \* \*